United States Patent
Ahn et al.

(10) Patent No.: US 10,301,457 B2
(45) Date of Patent: May 28, 2019

(54) CROSSLINKED COMPOSITION COMPRISING ETHYLENE VINYL ACETATE COPOLYMER AND NITRILE RUBBER

(71) Applicant: NEXANS, Courbevoie (FR)

(72) Inventors: Dae-Up Ahn, Chungcheongbuk-do (KR); Jong-Chan Lim, Chungcheongbuk-do (KR)

(73) Assignee: NEXANS, Courbevoie (FR)

( * ) Notice: Subject to any disclaimer, the term of this patent is extended or adjusted under 35 U.S.C. 154(b) by 43 days.

(21) Appl. No.: 15/723,636

(22) Filed: Oct. 3, 2017

(65) Prior Publication Data

US 2018/0100059 A1 Apr. 12, 2018

(30) Foreign Application Priority Data

Oct. 6, 2016 (KR) .................. 10-2016-0128859

(51) Int. Cl.
| | | |
|---|---|---|
| C08L 9/02 | (2006.01) | |
| C08J 3/24 | (2006.01) | |
| C08L 31/04 | (2006.01) | |
| H01B 7/28 | (2006.01) | |
| H01B 7/295 | (2006.01) | |
| C08L 23/08 | (2006.01) | |

(52) U.S. Cl.
CPC .............. C08L 9/02 (2013.01); C08J 3/247 (2013.01); C08L 23/0853 (2013.01); C08L 31/04 (2013.01); H01B 7/28 (2013.01); H01B 7/295 (2013.01); C08J 2309/02 (2013.01); C08J 2331/04 (2013.01); C08J 2409/02 (2013.01); C08J 2431/04 (2013.01); C08L 2205/03 (2013.01); C08L 2205/05 (2013.01); C08L 2312/00 (2013.01); Y02A 30/14 (2018.01)

(58) Field of Classification Search
CPC .... C08J 3/247; C08J 2431/04; C08J 2409/02; C08J 2331/04; C08J 2309/02; C08L 31/04; C08L 9/02; C08L 23/0853; C08L 2312/00; C08L 2205/03; C08L 2205/05; H01B 7/295; H01B 7/28; Y02A 30/14
See application file for complete search history.

(56) References Cited

U.S. PATENT DOCUMENTS

2003/0162906 A1* 8/2003 Ruepping ............. C08F 255/02
525/331.4
2014/0011029 A1 1/2014 Brigandi

FOREIGN PATENT DOCUMENTS

| DE | 10249810 | 5/2004 |
|---|---|---|
| EP | 0242874 | 10/1987 |
| EP | 0531788 | 3/1993 |
| KR | 10-0233963 | 12/1999 |
| KR | 10-2008-0079515 | 9/2008 |

OTHER PUBLICATIONS

KIPO Office Action dated Jun. 15, 2017.

* cited by examiner

*Primary Examiner* — Nathan M Nutter
(74) *Attorney, Agent, or Firm* — Sofer & Haroun, LLP

(57) ABSTRACT

A crosslinked composition for use as a sheath layer of cable is obtained from polymer blend having ethylene vinyl acetate copolymer (EVA), nitrile rubber (NBR) and crosslinking agent. The polymer blend further has a reactive polymer containing at least one nucleophilic or electrophilic functional group and a reactive compound selected from amphiphilic compound containing at least one nucleophilic or electrophilic functional group that can chemically react with nucleophilic or electrophilic functional group of the reactive polymer.

20 Claims, No Drawings

CROSSLINKED COMPOSITION COMPRISING ETHYLENE VINYL ACETATE COPOLYMER AND NITRILE RUBBER

RELATED APPLICATION

This application is related to and claims the benefit of priority from Korean Patent Application No. 10-2016-0128859, filed on Oct. 6, 2016, the entirety of which is incorporated by reference.

BACKGROUND

Field of the Invention

The present invention relates to a crosslinked composition, in particular being used for cable, obtained from polymer blend comprising ethylene vinyl acetate copolymer (EVA), and nitrile rubber (NBR).

In addition, the present invention relates to a method for preparing the crosslinked composition.

Furthermore, the present invention, relates to a cable, preferably for ship or offshore plant, comprising said crosslinked composition.

Description of Related Art

The ethylene vinyl acetate copolymer (EVA) is a polymer having good ozone resistant properties, thermo-resistant properties and weather resistant properties. The nitrile rubber (NBR) is a polymer having good oil-resistant properties, flame retardant properties and abrasion resistant properties. If said two polymers are mixed to from a well compatibilized polymer blend, said polymer blend can have improved thermo-resistant and weather resistant properties of ethylene vinyl copolymer as well as improved oil resistant properties and flame retardant properties of nitrile rubber.

However, EVA, in particular having vinyl acetate content of 50% by weight or less, is in-compatible with NBR in any acetonitrile ratio. If two polymers, which are incompatible with each other, are mixed and crosslinked, a spontaneous macro-phase separation is occurred under the temperature less than critical temperature, and the crosslinking agent may be distributed in only one phase selectively, then the degree of crosslinking may differ between two phases, and thus, the mechanical properties of the crosslinked product may be un-uniformed and decreased.

In order to compatibilize two polymers which are incompatible with each other, the reactive compatibilization may be considered. The reactive compatibilization is a process to induce chemical reaction between two incompatible polymers so as to prevent from spontaneous phase separation, and to make a stable and prolonged phase. It can be achieved by the "in situ" formation of amphiphilic compatibilizer in the form of block or graft copolymer at the interface of separated phases during mixing and crosslinking at high temperature. Since this method does not need a separate step of making amphiphilic compatibilizer having good affinity to both two polymer components of polymer blend, it is simple, and thus has an advantage in that it is easy to be used commercially.

However, if both polymer components to be mixed do not have reactive functional group that can be reacted with each other, such as NBR and EVA, at least two reactive polymers having appropriate affinity to both polymer components and that can react with each other are necessary for the reactive compatibilization. However, it is difficult to find such reactive polymer pair that can be used commercially. In addition, since most commercially available reactive polymer that can be used in compatibilization has a number average molecular weight mainly more than 10,000 g/mol, it is not easy for the two reactive polymer pair to be dispersed into the interphase of separated polymer phases and chemically react with each other.

Therefore, there still remains in the related art demands for finding commercially available reactive polymers or compounds for reactive compatibilization of EVA and NBR which are incompatible with each other, and demands for finding polymer composition of EVA and NBR having improved mechanical or chemical properties as well as being easy to make.

See also [Patent Publication No. 1] WO 2000/34383 (published on Jun. 15, 2000)

OBJECTS AND SUMMARY

It is an object of the present invention to provide a crosslinked composition obtained from polymer blend of EVA and NBR, in particular for a cable, preferably for use as a sheath layer for cable, with optimized physical properties and improved oil-resistant properties, while being easy to manufacture.

It is another object of the present invention to provide a method for preparing said crosslinked composition.

It is another object of the present invention to provide cable, preferably ship or offshore cable, comprising said crosslinked composition.

In order to achieve the object, the present invention provides a crosslinked composition obtained from a polymer blend comprising ethylene vinyl acetate copolymer (EVA), nitrile rubber (NBR) and crosslinking agent, characterized in that said polymer blend further comprises:
- a reactive polymer containing at least one nucleophilic or electrophilic functional group; and
- a reactive compound selected from amphiphilic compound containing at least one nucleophilic or electrophilic functional group that can chemically react with said nucleophilic or electrophilic functional group of reactive polymer, the reactive compound being more preferably different from the reactive polymer.

In a preferable embodiment, when said reactive polymer contains a nucleophilic functional group, the reactive compound contains an electrophilic functional group, or when said reactive polymer contains an electrophilic functional group, the reactive compound contains a nucleophilic functional group.

In one embodiment, the ethylene vinyl acetate copolymer has 50% by weight or less of vinyl acetate content.

In one another embodiment, the difference of Hildebrand solubility parameter between EVA and NBR can be more than 0.5 $(cal/cm^3)^{1/2}$, and Hildebrand solubility parameter of the reactive polymer and the reactive compound can be in the range of from 8.0 to 10.5 $(cal/cm^3)^{1/2}$, separately.

In one embodiment according to the present invention, the electrophilic functional group of reactive polymer is selected from cyclic anhydride, epoxide, oxazoline, carbodiimide, isocyanate, carboxyl group and the combination thereof, or said nucleophilic functional group of reactive polymer is selected from amine, amide, hydroxyl group and the combination thereof.

In another embodiment, the electrophilic functional group of reactive compound is selected from cyclic anhydride, epoxide, oxazoline, carbodiimide, isocyanate, carboxyl group, and the combination thereof, or said nucleophilic functional group of reactive compound is selected from amine, amide, hydroxyl group, and the combination thereof.

Preferably, the reactive polymer according to the present invention can contain nucleophilic or electrophilic functional group in an amount of 0.5% by weight or more, preferably 3% by weight or more, and can have more than 5,000 g/mol of number average molecular weight.

In one preferred and non-limited embodiment, the reactive polymer can be selected from the group consisting of:

(a) a reactive polymer containing electrophilic functional groups selected from:

ethylene-acrylic ester-glycidyl methacrylate terpolymer (E-AE-GMA), ethylene-vinyl acetate-acrylic ester-glycidyl methacrylate terpolymer, ethylene-glycidyl methacrylate copolymer (E-GMA), ethylene-vinyl acetate-maleic anhydride terpolymer, maleic anhydride-grafted ethylene vinyl acetate copolymer (MA-g-EVA), maleic anhydride-grafted ethylene-propylene-diene terpolymer, maleic anhydride-grafted ethylene-propylene copolymer, maleic anhydride-grafted poly(butadiene), ethylene-vinyl acetate-acrylic ester-carboxylated ethylene copolymer, and carboxylated ethylene-vinyl acetate copolymer (CA-EVA);

(b) polyamide, poly(vinyl alcohol), poly(acrylic acid), polyurea, polyurethane, containing at least one functional group selected from amine, amide, hydroxyl and carboxyl group in their main chain; and high density of branched, such as high order branched or dendrimer of, polyamide, polyuria, polyurethane, polyester and polyether, containing at least one functional group selected from amine, amide, hydroxyl and carboxyl functional group at a number of their terminals.

In one preferred and non-limited embodiment, the reactive compound can be selected from:

stearylamine (SAmine), stearamide, ethylene-bis-stearamide, erucamide, oleamide, behenamide, 4,4'-diaminodiphenylmethane, 1,12-diaminododecane, palmitic acid, stearic acid, oleic acid, behenic acid, erucic acid, dodecanedioic acid, 2-octyl-1-dodecanol, 1,12-dodecanediol, 1-hexadecanol, castor oil, epoxidized soybean oil, glycidyl methacrylate, bisphenol A diglycidyl ether, 2-isopropenyl-2-oxazoline, ricinoloxazoline maleinate, N,N'-dicyclohexylcarbodiimide, 1-ethyl-3-(3-dimethylaminopropyl)carbodiimide, hexamethylene diisocyanate, 4,4'-methylene diphenyl diisocyanate, toluene-2,4-diisocyanate, and isophorone diisocyanate.

In one preferred embodiment, the reactive compound has 5,000 g/mol or less of molecular weight.

Preferably, the weight ratio of EVA:NBR in the crosslinked composition of the present invention can be from 10:90 to 90:10.

In one preferable embodiment, the polymer blend comprises 1 to 20 parts by weight of reactive polymer, 1 to 20 parts by weight of reactive compound and 0.1 to 10 parts by weight of crosslinking agent, said parts by weight being expressed with respect to 100 parts of sum of EVA and NBR.

In addition, the present invention provides a method for preparing the crosslinked composition according to the present invention, comprising:

(a) mixing ethylene vinyl acetate copolymer (EVA), nitrile rubber (NBR), crosslinking agent, reactive polymer and reactive compound under high temperature to obtain polymer blend;

(b) crosslinking said polymer blend in a mold under high temperature and high pressure.

In addition, the present invention provides a cable comprising the crosslinked composition according to present invention. Preferably, said crosslinked composition can be used as a sheath layer of cable for ship or offshore cable.

The crosslinked composition according to the present invention has improved whether resistant and thermos-resistant properties compared with nitrile rubber, and improved oil resistant properties and flame retardant properties compared with ethylene vinyl acetate copolymer, as well as good mechanical properties, so that it can be used as a rubber material in the industrial market, in particular for cable, preferably as a sheath layer for non-halogen based flame retardant cable.

In addition, the crosslinked composition according to the present invention has an advantage of being easy to produce.

DETAILED DESCRIPTION

Hereinafter, the invention will be described in more detail. The crosslinked composition according to the present invention is obtained from polymer blend comprising ethylene vinyl acetate copolymer (EVA), nitrile rubber (NBR) and crosslinking agent, and said polymer blend further comprises reactive polymer and reactive compound.

Polymer Blend

The polymer blend according to the present invention comprises ethylene vinyl acetate copolymer and nitrile rubber.

The ethylene vinyl acetate copolymer (EVA) is a copolymer that is produced via polymerization of ethylene monomer and vinyl acetate (VA) monomer. The EVA does not contain double bond in its main chain, and has good weather resistant properties, good thermos resistant properties and good ozone resistant properties. In one embodiment, said EVA has 50% by weight or less of VA content.

The nitrile rubber (NBR) of the present invention refers to an unsaturated copolymer of 2-propenenitrile and butadiene monomer. It contains a large number of polar functional groups of acrylonitrile (AN), and has outstanding oil resistant properties, flame retardant properties and abrasion resistant properties. The ethylene vinyl acetate copolymer and nitrile rubber of the present invention are mixed to form a compatibilized composition according, so that the composition of the present invention has outstanding mechanical properties, as well as improved heat resistance and weather resistance compared with nitrile rubber, and improved oil resistance and flame retardant properties compared with ethylene vinyl acetate.

As the content of VA or AN increases, the Hildebrand (Hildebrand) solubility parameter of EVA or NBR according to the present invention increases. In one embodiment, the EVA according to the present invention has a Hildebrand (Hildebrand) solubility parameter of between 8.0 and 9.0, preferably between 8.2 and 8.6 $(cal/cm^3)^{1/2}$. In another embodiment, the NBR according to the present invention has a Hildebrand (Hildebrand) solubility parameter of between 9.5 and 10.5, preferably between 9.7 and 10.3 $(cal/cm^3)^{1/2}$.

As the difference of Hildebrand solubility parameter between EVA and NBR increases, the non-compatibility of two polymers increases. In one embodiment of the present invention, the difference of solubility parameter between two polymers is more than 0.5 $(cal/cm^3)^{1/2}$, preferably more than 1 $(cal/cm^3)^{1/2}$. Since the two polymers are incompatible, the reactive polymer and the reactive compound are added to the polymer blend of said two polymers for their compatibilization, in particular their reactive compatibilization.

Reactive Polymer

The reactive polymer according to the present invention contains at least one of nucleophilic or electrophilic functional group. The nucleophilic functional group of the present invention refers to a functional group which donates an electron pair to an electrophile to form a chemical bond. Preferably, said nucleophilic functional group is selected from amine, amide, hydroxyl group and the combination thereof.

The electrophilic functional group of the present invention refers to a functional group which can accept electron pair from nucleophile to form a chemical bond. Preferably, said electrophilic functional group is selected from cyclic anhydride, epoxide, oxazoline, carbodiimide, isocyanate, carboxyl group and the combination thereof.

In one preferable embodiment, said reactive polymer contains at least one of nucleophilic functional group or electrophilic functional group in amount of 0.5% by weight or more, preferably 3% by weight or more. In another preferable embodiment, said reactive polymer has a number average molecular weight of more than 5,000 g/mol.

More preferably, the reactive polymer can be selected from the group consisting of:

(a) a reactive polymer containing electrophilic functional group selected from:

ethylene-acrylic ester-glycidyl methacrylate terpolymer (E-AE-GMA), ethylene-vinyl acetate-acrylic ester-glycidyl methacrylate terpolymer, ethylene-glycidyl methacrylate copolymer (E-GMA), ethylene-vinyl acetate-maleic anhydride terpolymer, maleic anhydride-grafted ethylene vinyl acetate copolymer (MA-g-EVA), maleic anhydride-grafted ethylene-propylene-diene terpolymer, maleic anhydride-grafted ethylene-propylene copolymer, maleic anhydride-grafted poly(butadiene), ethylene-vinyl acetate-acrylic ester-carboxylated ethylene copolymer, and carboxylated ethylene-vinyl acetate copolymer: CA-EVA);

(b) polyamide, poly(vinyl alcohol), poly(acrylic acid), polyurea, or polyurethane, containing at least one functional group selected from amine, amide, hydroxyl, carboxyl group in its main chain; and high density branched, such as high order branched or dendrimer of, polyamide, polyuria, polyurethane, polyester or polyether, containing at least one functional group selected from amine, amide, hydroxyl and carboxyl functional group at a number of its terminals.

Reactive Compound

The reactive compound according to the present invention is selected from amphiphilic organic compounds containing at least one of electrophilic or nucleophilic functional group, which can chemically react with the nucleophilic or electrophilic functional group of reactive polymer. Preferably, said nucleophilic functional group can be selected from amine, amide, hydroxyl group and a combination thereof. In addition, said electrophilic functional group can be selected from cyclic anhydride, epoxide, oxazoline, carbodiimide, isocyanate, carboxyl group, and a combination thereof. When the reactive polymer of the present invention contains the nucleophilic functional group, the reactive compound contains electrophilic functional group that can chemically react with said nucleophilic functional group of reactive polymer. Also, when the reactive polymer contains an electrophilic functional group, the reactive compound contains a nucleophilic functional group that can chemically react with the electrophilic functional group of said reactive polymer.

In one embodiment, the reactive compound according to the present invention is an amphiphilic organic compound having 5,000 g/mol or less of molecular weight, more preferably is not limited to but including:

(a) an amphiphilic organic compound having at least one amine group, such as stearylamine (SAmine), stearamide, ethylene-bis-stearamide, erucamide, oleamide, behenamide, 4,4'-diaminodiphenylmethane, 1,12-diaminododecane;

(b) an amphiphilic organic compound containing at least one carboxyl group, such as palmitic acid, stearic acid, oleic acid, behenic acid, erucic acid, dodecanedioic acid;

(c) an amphiphilic organic compound containing at least one hydroxyl group, such as 2-octyl-1-dodecanol, 1,12-dodecanediol, 1-hexadecanol, castor oil;

(d) an amphiphilic organic compound containing at least one epoxide group such as epoxidized soybean oil, glycidyl methacrylate, bisphenol A diglycidyl ether;

(e) an amphiphilic organic compound containing at least one oxazoline group, such as 2-isopropenyl-2-oxazoline, ricinoloxazoline maleinate, (f) an amphiphilic organic compound containing at least one carbodiimide group, such as N,N'-dicyclohexylcarbodiimide, 1-ethyl-3-(3-dimethylaminopropyl)carbodiimide); and (g) an amphiphilic organic compound containing at least one isocyanate group, such as hexamethylene diisocyanate, 4,4'-methylene diphenyl diisocyanate, toluene-2,4-diisocyanate, and isophorone diisocyanate.

The reactive compound according to the present invention has a molecular weight lower than that of reactive polymer, it can be dispersed more easily into the interphase of separated polymer phases under the same processing temperature, and chemically react with the reactive polymer more rapidly compared to two different conventional reactive polymers. Therefore, the reactive compound and the reactive polymer according to the present invention induce reactive compatibilization of EVA and NBR more effectively compared with two different conventional reactive polymers.

In more preferable embodiment, the reactive compound according to the present invention can be selected from stearyl amine (SAmine), castor oil (CSO) and the combination thereof. The stearyl amine having one amine group at the molecular terminal can react with reactive polymer having electrophilic functional group to form a polymer compatibilizer having graft structure. Also, the castor oil having internal hydroxyl group, can react with the reactive polymer having electrophilic functional group to form a polymer compatibilizer having crosslinked structure.

In order to form a polymer compatibilizer, the reactive polymer and the reactive compound according to the present invention chemically react with each other preferably in the interphase between two separated phases. In order to do this, said reactive polymer and the reactive compound may have the Hildebrand solubility parameters, preferably more than {(the median value of Hildebrand solubility parameters of two polymer components)−(the difference of Hildebrand solubility parameter between two polymer components) *0.5} $(cal/cm^3)^{1/2}$, more preferably more than {(the median value of Hildebrand solubility parameters of two polymer components)−(the difference of Hildebrand solubility parameter between two polymer components)*0.25} $(cal/cm^3)^{1/2}$; and preferably less than {(the median value of Hildebrand solubility parameters of two polymer components)+(the difference of Hildebrand solubility parameter between two polymer components)*0.5} $(cal/cm^3)^{1/2}$, more preferably less than {(the median value of Hildebrand solubility parameters of two polymer components)+(the difference of Hildebrand solubility parameter between two polymer components)*0.25} $(cal/cm^3)^{1/2}$, separately.

In one preferable embodiment, the reactive polymer and the reactive compound according to the present invention have Hildebrand solubility parameter of between 8.0 and 10.5 $(cal/cm^3)^{1/2}$, preferably between 8.6 and 9.9 $(cal/cm^3)^{1/2}$, separately. When the reactive polymer and the reactive compound have said range of Hildebrand solubility parameter, most of them are positioned at interphase between the separated phases of two polymers of EVA and NBR and chemically react with each other during the polymer blend being mixed and crosslinked under high temperature, to form a polymer compatibilizer, and said polymer compatibilizer thus obtained stabilizes the phase of polymer blend effectively.

In one preferable embodiment, the content of the reactive polymer and the reactive compound can be from 1 to 20 parts by weight with respect to 100 parts by weight of NBR and EVA.

Crosslinking Agent

The polymer blend according to the present invention comprises a crosslinking agent. Said crosslinking agent makes the polymer blend chemically crosslinked so as to obtain the crosslinked composition. In one embodiment of the present invention, said crosslinking agent includes general sulfur or peroxide crosslinking agents. In one embodiment, the content of said crosslinking agent can be from 0.1 to 10 parts by weight, preferably from 1 to 5 parts by weight, more preferably 1 to 3 pars by weight, said amount being expressed with respect to 100 parts by weight of EVA and NBR.

Other Additives

The composition according to the present invention may optionally further comprise organic additives and/or inorganic additives. Preferably, metal-based or ceramic-based inorganic additives may be added to the composition, in particular to the polymer blend of the present invention, for example, in order to improve physical properties, improve flame retardant properties, or catalyze reactive compatibilization. In one non-limited embodiment, said metal-based or ceramic-based inorganic additives includes carbon black, $CaCO_3$, talc, clay, graphite, silica, mica, antimony trioxide, lead oxide, aluminum hydroxide, magnesium hydroxide, magnesium oxide, zinc oxide, antimony triacetate, zinc acetate, $MoO_3$, $TiO_2$, Tin(II) acetate, Tin(II) stearate and Tin(II) 2-ethylhexanoate, dibutyltin dilaurate, bismuth-based catalyst, protonated microporous aluminosilicate mineral, acid-functionalized silica. In one preferable embodiment, the inorganic additives can be inorganic catalyst, preferably zinc oxide, antimony triacetate, dibutyltin dilaurate or bismuth-based catalyst, which can catalyze reactive compatibilization so as to form a crosslinked composition having improved mechanical properties.

In another embodiment, the organic additives can be added, for example, in order to improve processability, improve mechanical properties, improve dispersibility, improve flame retardancy, or catalyze reactive compatibilization. Preferably, the organic additives may include antioxidant, stabilizer, plasticizer, softeners, extenders, pigment, coupling agent, flame retardants, and crosslinking aids.

In one non-limited embodiment, the content of said inorganic additives can be at most 200 parts by weight with respect to 100 parts by weight of NBR and EVA, the content of said organic additives can be at most 100 parts by weight with respect to 100 parts by weight of NBR and EVA.

Preparation Method

The crosslinked composition according to the present invention may be produced by a method comprising:

(a) mixing ethylene vinyl acetate copolymer (EVA), nitrile rubber (NBR), crosslinking agent, reactive polymer and reactive compound under high temperature to obtain polymer blend;

(b) crosslinking said polymer blend in mold, particularly compression mold, under high temperature and high pressure.

In one embodiment, said mixing of step (a) can be carried out by mixer, preferably, two-roll mill or internal mixer such as Banbury mixer, kneader, and the mixing temperature can be decided depending on the melting point or softening point of reactive polymer. For example, in case that the reactive polymer is E-GMA or E-AE-GMA, the mixing can be carried out by using two-roll mill, preferably under the mixing temperature of 120° C. to 130° C., and in case that the reactive polymer is MA-g-EVA190, MA-g-EVA250 or CA-EVA, the mixing can be carried out by using two-roll mill preferably under the mixing temperature of 70° C. to 100° C. In another embodiment, in case that the melting point or softening point is so high that the mixing of step (a) should be carried out under the temperature more than 130° C., internal mixer such as Banbury mixer, kneader can be used instead of two-roll mill. In that case, the crosslinking agent may be added during two-roll mill process carried out under the temperature not more than 130° C. after internal mixing process, so as to prevent premature curing that can be occurred during internal mixing procedure.

In another embodiment according to the present invention, the crosslinking procedure of step (b) can be carried out under the temperature of from 150° C. to 190° C., preferably from 160° C. to 180° C., and a pressure of 7 to 18 MPa for the crosslinking time of from 1 min to 60 min, preferably from 5 min to 20 min.

In one another embodiment, the aforementioned other additives, such as inorganic additives or organic additives, may be further added in the step (a), depending on the particular properties required to the crosslinked composition, particularly for use as a sheath layer of cable, for example, for ship or offshore plant.

In the preparing method according to the present invention, the reactive polymer and the reactive compound can chemically react with each other to from a polymer compatibilizer in the interphase of two polymer phases during mixing and crosslinking steps of the polymer blend, and then the spontaneous reactive compatibilization is occurred. Thus, the preparation method of the present invention can be commercially used more easily compared to the conventional method using particular polymer compatibilizer having good affinity to both two polymer components to be mixed.

Cable

In addition, the present invention provides a cable comprising a crosslinked composition according to the present invention, in particular for use as a sheath layer. Since said composition has outstanding mechanical properties, weather resistant properties, flame retardant properties and oil resistant properties, it can be used for ship or offshore cable.

Hereinafter, the present invention is described in further detail in the following Examples which are not in any way intended to limit the scope of the invention as claimed. In addition, it will appear to a person skilled in the art that various modifications may be made to the disclosed Examples, and that such modifications are intended to be within the scope of the present invention.

EXAMPLES

Preparation of Crosslinked Composition Comprising EVA/NBR (Representative Example of Preparation)

As a representative example of preparing a crosslinked composition according to the present invention, a crosslinked composition is prepared using the components and the mixing ratio as shown in Table 1 below.

TABLE 1

| Component | Ratio(phr) | Ratio(wt %) |
|---|---|---|
| EVA(Evatane 28-05) | 50 | 44 |
| NBR | 50 | 44 |
| E-GMA | 5 | 4.4 |
| Stearyl amine | 3 | 2.6 |
| antioxidant(DDA-70) | 1 | 0.88 |
| antioxidant(PCD-50) | 3 | 2.6 |
| crosslinking agent(Perbutyl P) | 2 | 1.8 |

In the Table 1, phr refers to parts by weight with respect to 100 parts by weight of rubber, i.e. the sum of EVA and NBR.

Firstly, the inventors mixed following components with the ratio disclosed in Table 1, using a two-roll mill at 120° C. for 20 minutes:

EVA with a vinyl acetate content of 28% by weight commercialized by Arkema under the reference of Evatane 28-05 (Hildebrand solubility parameter 8.4 $(cal/cm^3)^{1/2}$);

NBR with a acrylonitrile (AN) content of 42% by weight commercialized by LG Chem under the reference of NBR B3250 (Hildebrand solubility parameter 10.0 $(cal/cm^3)^{1/2}$;

E-GMA copolymer with GMA content of 8% by weight commercialized by Arkema under the reference of LOTADER AX8840 (Hildebrand solubility parameter 8.3 $(cal/cm^3)^{1/2}$);

stearyl amine commercialized by AkzoNobel under the reference of Armeen 18D (molecular weight: 270 g/mol, Hildebrand solubility parameter 9.5 $(cal/cm^3)^{1/2}$);

dipenylamine derivatives (the content of diphenylamine derivatives is 70% by weight) commercialized by RheinChemie under a reference of Rhenofit DDA-70;

polycarbodiimide (the content of polycarbodiimide is 50% by weight) commercialized by RheinChemie under the reference of Rhenogran PCD-50;

bis(t-butylperoxyisopropyl)benzene commercialized by NOF Corporation under the reference of Perbutyl P.

The mixture thus obtained was compressed under the 170° C./12.5 MPa in mold for a period of tc90 defined below, and as a result, the flat type of crosslinked composition having thickness of 1 mm was made. The aforementioned tc90 refers to a time taken to reach to 90% of the maximum ODR torque value, which is increased as the crosslinking reaction is occurred in the ODR (Oscillation disk rheometer) test under the condition as defined in ASTM D2084.

Evaluation Method for Mechanical Properties of Crosslinked Composition

The mechanical properties such as tensile strength (TS) and Elongation at break (EB) of crosslinked product were determined by preparing dumbbell-shaped specimen as defined in the standard DIN 53504.S2, and then using a universal tensile strength tester under the condition as defined in standard IEC 60811-1-1. When both values of the tensile strength and the elongation at break are higher, the mechanical properties are considered to be better on the whole.

Evaluation Method for Oil-Resistant Properties of the Crosslinked Composition In order to determine oil-resistant properties, said dumbbell-shaped specimen was treated with IRM 902 oil at 100° C. for 46 hours, and then the change of tensile strength and elongation at break were measured. When the rate of change in tensile strength and elongation at break is lower, the oil resistant properties is considered to be better.

Properties Determined Using Crosslinked Compositions

In order to identify aforementioned properties of the crosslinked composition, the crosslinked compositions were prepared using the components, mixing ratio and roll temperature in Table 2 below according to the method that is described in the representative preparation example. Also, the tensile strength and elongation at break of said compositions were measured according to the method described before. The results are also presented in the Table 2.

TABLE 2

| number | component | Ratio (phr) | Roll temperature (° C.) | Tensile strength (MPa) | Elongation at break (%) |
|---|---|---|---|---|---|
| 1* | EVA | 50 | 70 | 14.3 | 370 |
|  | NBR | 50 | 120 | 14.4 | 390 |
|  | DDA-70 | 1 |  |  |  |
|  | PCD-50 | 3 |  |  |  |
|  | PBP-98 | 2 |  |  |  |
| 2* | EVA | 50 | 70 | 13.6 | 500 |
|  | NBR | 50 | 120 | 13.8 | 500 |
|  | DDA-70 | 1 |  |  |  |
|  | PCD-50 | 3 |  |  |  |
|  | PBP-98 | 2 |  |  |  |
|  | SAmine | 3 |  |  |  |
| 3* | EVA | 50 | 70 | 15.9 | 430 |
|  | NBR | 50 | 120 | 16.0 | 440 |
|  | DDA-70 | 1 |  |  |  |
|  | PCD-50 | 3 |  |  |  |
|  | PBP-98 | 2 |  |  |  |
|  | CSO | 3 |  |  |  |
| 4* | EVA | 50 | 120 | 16.3 | 400 |
|  | NBR | 50 |  |  |  |
|  | DDA-70 | 1 |  |  |  |
|  | PCD-50 | 3 |  |  |  |
|  | PBP-98 | 2 |  |  |  |
|  | E-GMA | 5 |  |  |  |
| 5 | EVA | 50 | 120 | 20.3 | 480 |
|  | NBR | 50 |  |  |  |
|  | DDA-70 | 1 |  |  |  |
|  | PCD-50 | 3 |  |  |  |
|  | PBP-98 | 2 |  |  |  |
|  | E-GMA | 5 |  |  |  |
|  | SAmine | 3 |  |  |  |
| 6 | EVA | 50 | 120 | 19.3 | 460 |
|  | NBR | 50 |  |  |  |
|  | DDA-70 | 1 |  |  |  |
|  | PCD-50 | 3 |  |  |  |
|  | PBP-98 | 2 |  |  |  |
|  | E-GMA | 5 |  |  |  |
|  | CSO | 3 |  |  |  |
| 7 | EVA | 50 | 120 | 20.1 | 450 |
|  | NBR | 50 |  |  |  |

TABLE 2-continued

| number | component | Ratio (phr) | Roll temperature (° C.) | Tensile strength (MPa) | Elongation at break (%) |
|---|---|---|---|---|---|
| | DDA-70 | 1 | | | |
| | PCD-50 | 3 | | | |
| | PBP-98 | 2 | | | |
| | E-GMA | 5 | | | |
| | CSO | 3 | | | |
| | ZnO | 3 | | | |
| 8 | EVA | 50 | 120 | 20.9 | 440 |
| | NBR | 50 | | | |
| | DDA-70 | 1 | | | |
| | PCD-50 | 3 | | | |
| | PBP-98 | 2 | | | |
| | E-GMA | 5 | | | |
| | CSO | 3 | | | |
| | Sb2O3 | 3 | | | |
| 9* | EVA | 50 | 120 | 14.8 | 400 |
| | NBR | 50 | | | |
| | DDA-70 | 1 | | | |
| | PCD-50 | 3 | | | |
| | PBP-98 | 2 | | | |
| | E-AE-GMA | 5 | | | |
| 10 | EVA | 50 | 120 | 17.7 | 480 |
| | NBR | 50 | | | |
| | DDA-70 | 1 | | | |
| | PCD-50 | 3 | | | |
| | PBP-98 | 2 | | | |
| | E-AE-GMA | 5 | | | |
| | SAmine | 3 | | | |
| 11 | EVA | 50 | 120 | 16.8 | 450 |
| | NBR | 50 | | | |
| | DDA-70 | 1 | | | |
| | PCD-50 | 3 | | | |
| | PBP-98 | 2 | | | |
| | E-AE-GMA | 5 | | | |
| | CSO | 3 | | | |
| 12* | EVA | 50 | 70 | 13.4 | 410 |
| | NBR | 50 | | | |
| | DDA-70 | 1 | | | |
| | PCD-50 | 3 | | | |
| | PBP-98 | 2 | | | |
| | MA-g-EVA250 | 5 | | | |
| 13 | EVA | 50 | 70 | 15.5 | 510 |
| | NBR | 50 | | | |
| | DDA-70 | 1 | | | |
| | PCD-50 | 3 | | | |
| | PBP-98 | 2 | | | |
| | MA-g-EVA250 | 5 | | | |
| | SAmine | 3 | | | |
| 14 | EVA | 50 | 70 | 18.3 | 490 |
| | NBR | 50 | | | |
| | DDA-70 | 1 | | | |
| | PCD-50 | 3 | | | |
| | PBP-98 | 2 | | | |
| | MA-g-EVA250 | 5 | | | |
| | CSO | 3 | | | |
| 15 | EVA | 50 | 70 | 17.8 | 490 |
| | NBR | 50 | | | |
| | DDA-70 | 1 | | | |
| | PCD-50 | 3 | | | |
| | PBP-98 | 2 | | | |
| | MA-g-EVA190 | 5 | | | |
| | SAmine | 3 | | | |
| 16 | EVA | 50 | 70 | 22.0 | 480 |
| | NBR | 50 | | | |
| | DDA-70 | 1 | | | |
| | PCD-50 | 3 | | | |
| | PBP-98 | 2 | | | |
| | MA-g-EVA190 | 5 | | | |
| | CSO | 3 | | | |
| 17 | EVA | 50 | 70 | 14.9 | 420 |
| | NBR | 50 | | | |
| | DDA-70 | 1 | | | |
| | PCD-50 | 3 | | | |
| | PBP-98 | 2 | | | |
| | CA-EVA | 5 | | | |
| | SAmine | 3 | | | |
| 18 | EVA | 50 | 70 | 16.4 | 430 |
| | NBR | 50 | | | |
| | DDA-70 | 1 | | | |
| | PCD-50 | 3 | | | |
| | PBP-98 | 2 | | | |
| | CA-EVA | 5 | | | |
| | SAmine | 3 | | | |
| | ZnO | 1 | | | |
| 19 | EVA | 50 | 70 | 17.1 | 490 |
| | NBR | 50 | | | |
| | DDA-70 | 1 | | | |
| | PCD-50 | 3 | | | |
| | PBP-98 | 2 | | | |
| | CA-EVA | 5 | | | |
| | CSO | 3 | | | |
| 20* | EVA | 30 | 120 | 9.3 | 310 |
| | NBR | 70 | | | |
| | DDA-70 | 1 | | | |
| | PCD-50 | 3 | | | |
| | PBP-98 | 2 | | | |
| 21 | EVA | 30 | 120 | 13.6 | 370 |
| | NBR | 70 | | | |
| | DDA-70 | 1 | | | |
| | PCD-50 | 3 | | | |
| | PBP-98 | 2 | | | |
| | E-GMA | 5 | | | |
| | CSO | 3 | | | |
| 22* | EVA | 10 | 120 | 5.6 | 220 |
| | NBR | 90 | | | |
| | DDA-70 | 1 | | | |
| | PCD-50 | 3 | | | |
| | PBP-98 | 2 | | | |
| 23 | EVA | 10 | 120 | 6.2 | 270 |
| | NBR | 90 | | | |
| | DDA-70 | 1 | | | |
| | PCD-50 | 3 | | | |
| | PBP-98 | 2 | | | |
| | E-GMA | 5 | | | |
| | CSO | 3 | | | |

In the Table 2,

Phr refers to parts by weight with respect to 100 parts by weight of rubber, said rubber being EVA and NBR.

'*' denote the number of comparative example not belonging to the scope of present invention;

E-GMA refers to ethylene glycidyl methacrylate copolymer commercialized by Arkema under the reference of LOTADER AX8840 (GMA content=8 wt. %) (Hildebrand solubility parameter 8.3 $((cal/cm^3)^{1/2})$;

E-AE-GMA refers to ethylene-acrylic ester-glycidyl methacrylate terpolymer (acrylic ester content=24 wt %, GMA content=8 wt. %) commercialized by Arkema under the reference of LOTADER AX8900 (Hildebrand solubility parameter 8.7 $(cal/cm^3)^{1/2})$;

MA-g-EVA250 refers to maleic anhydride-grafted ethylene vinyl acetate copolymer commercialized by DuPont under the reference of Fusabond C250 (Hildebrand solubility parameter 8.6 $(cal/cm^3)^{1/2})$, MA-g-EVA190 refers to anhydride-grafted ethylene vinyl acetate copolymer commercialized by DuPont under the reference of Fusabond C190 (Hildebrand solubility parameter 8.6 $((cal/cm^3)^{1/2})$;

CA-EVA refers to carboxylated ethylene-vinyl acetate copolymer (Acrylic acid content=4wt. %) commercialized by BYK Additives & Instruments under the reference of SCONA TPEV 5010 PB (Hildebrand solubility parameter 8.6 $(cal/cm^3)^{1/2})$;

CSO refers to a castor oil from Dongyan Uwha (molecular weight 927 g/mol, Hildebrand solubility parameter 8.9 $((cal/cm^3)^{1/2})$;

PBP-98 refers to bis(t-butylperoxyisopropyl)benzene commercialized by NOF Corporation under the reference of Perbutyl P.

As shown in Table 2, the crosslinked compositions of examples according to the present invention have significantly improved mechanical properties compared with the crosslinked composition according to the comparative examples.

In addition, the relatively more improved reactive compatibilization was shown when the reactive polymer contains epoxy functional group and the reactive polymer contains amine functional group (example 5 and 10), or when the reactive polymer contains maleic anhydride group or carboxyl group and the reactive compound contains hydroxyl group (examples 14, 16, 19).

Furthermore, when the crosslinked composition further comprises inorganic catalyst, it catalyzes the chemical reaction between the reactive polymer and the reactive compound, and the crosslinked compound thus obtained was shown to have more improved mechanical properties (example 7, 8, 18). Although the mechanical properties of the crosslinked composition were improved in any ratio of polymer components to be mixed, the mechanical properties were more improved as the ratio of EVA and NBR is close to 50:50 (example 6, 21 and 23).

In addition, the applicants measured the oil-resistant properties of the crosslinked compositions prepared by aforementioned preparation method, by using the evaluation method described before. The results are also presented in the Table 3 below.

TABLE 3

| Number | Rate of change in tensile strength | Rate of change in Elongation at break |
|---|---|---|
| 1 (comparative example) | −55% | −31% |
| 16 (example) | −37% | −21% |

As shown in Table 3, it is identified that the crosslinked composition of the example according to the present application has improved oil-resistant properties compared to the crosslinked composition of the comparative example.

Taken together, the crosslinked composition according to the present invention has improved mechanical and chemical properties, and therefore, the composition according to the present invention can be applied widely to the preparation of industrial rubber materials, in particular for cable, having various performances.

The invention claimed is:

1. A crosslinked composition,
wherein said crosslinked composition is obtained from a polymer blend having ethylene vinyl acetate copolymer (EVA), nitrile rubber (NBR) and crosslinking agent,
wherein said polymer blend further includes:
a reactive polymer containing at least one nucleophilic or electrophilic functional group; and
a reactive compound selected from amphiphilic compound containing at least one nucleophilic or electrophilic functional group that can chemically react with the nucleophilic or electrophilic functional group of reactive polymer.

2. The composition according to claim 1, wherein when the reactive polymer contains a nucleophilic functional group, the reactive compound contains an electrophilic functional group, or when the reactive polymer contains an electrophilic functional group, the reactive compound contains a nucleophilic functional group.

3. The composition according to claim 1, wherein the ethylene vinyl acetate copolymer has 50% by weight or less of vinyl acetate content.

4. The composition according to claim 1, wherein the difference of Hildebrand solubility parameter between EVA and NBR is more than 0.5 $(cal/cm^3)^{1/2}$.

5. The composition according to claim 1, wherein the reactive polymer and the reactive compound has between 8.0 and 10.5 $(cal/cm^3)^{1/2}$ of Hildebrand solubility parameter, separately.

6. The composition according to claim 1, wherein the electrophilic functional group of reactive polymer is selected from cyclic anhydride, epoxide, oxazoline, carbodiimide, isocyanate, carboxyl group, and the combination thereof.

7. The composition according to claim 1, wherein said nucleophilic functional group of reactive polymer is selected from amine, amide, hydroxyl group and the combination thereof.

8. The composition according to claim 1, wherein the electrophilic functional group of reactive compound is selected from cyclic anhydride, epoxide, oxazoline, carbodiimide, isocyanate, carboxyl group, and the combination thereof.

9. The composition according to claim 1, wherein said nucleophilic functional group of reactive compound is selected from amine, amide, hydroxyl group and the combination thereof.

10. The composition according to claim 1, wherein said reactive polymer contains nucleophilic or electrophilic functional group in an amount of 0.5% by weight or more.

11. The composition according to claim 1, wherein the reactive polymer has more than 5,000 g/mol of number average molecular weight.

12. The composition according to claim 1, wherein the reactive polymer is ethylene-acrylic ester-glycidyl methacrylate terpolymer, ethylene-vinyl acetate-acrylic ester-glycidyl methacrylate terpolymer, ethylene-glycidyl methacrylate copolymer, ethylene-vinyl acetate-maleic anhydride terpolymer, maleic anhydride-grafted ethylene vinyl acetate copolymer, maleic anhydride-grafted ethylene-propylene-diene terpolymer, maleic anhydride-grafted ethylene-propylene copolymer, maleic anhydride-grafted poly(butadiene), ethylene-vinyl acetate-acrylic ester-carboxylated ethylene copolymer or carboxylated ethylene-vinyl acetate copolymer.

13. The composition according to claim 1, wherein the reactive polymer is selected from the group consisting of:
polyamide, poly(vinyl alcohol), poly(acrylic acid), polyuria or polyurethane, containing at least one selected from amine, amide, hydroxyl and carboxyl functional group in its main chain; and
high-order branched or dendrimer of, polyamide, polyuria, polyurethane, or polyester, containing at least one selected from amine, amide, hydroxyl or carboxyl functional group at a number of its terminals.

14. The composition according to claim 1, wherein the reactive compound is selected from stearylamine (SAmine), stearamide, ethylene-bis-stearamide, erucamide, oleamide, behenamide, 4,4'-diaminodiphenylmethane, 1,12-diaminododecane, palmitic acid, stearic acid, oleic acid, behenic acid, erucic acid, dodecanedioic acid, 2-octyl-1-dodecanol, 1,12-dodecanediol, 1-hexadecanol, castor oil (CSO), epoxidized soybean oil, glycidyl methacrylate, bisphenol A diglycidyl ether, 2-isopropenyl-2-oxazoline, ricinoloxazoline maleinate, N,N'-dicyclohexylcarbodiimide, 1-ethyl-3-(3-dimethylaminopropyl)carbodiimide, hexamethylene diisocyanate, 4,4'-methylene diphenyl diisocyanate, toluene-2,4-diisocyanate, and isophorone diisocyanate.

15. The composition according to claim 1, wherein the reactive compound has 5,000 g/mol or less of molecular weight.

16. The composition according to claim 1, wherein the weight ratio of EVA:NBR in the crosslinked composition is from 10:90 to 90:10.

17. The composition according to claim 1, wherein the polymer blend comprises 1 to 20 parts by weight of reactive polymer, 1 to 20 parts by weight of reactive compound and 0.1 to 10 parts by weight of crosslinking agent, said amounts being expressed with respect to 100 parts of sum of EVA and NBR.

18. A method for preparing the crosslinked composition of claim 1, said method comprising the steps of:
   (a) mixing ethylene vinyl acetate copolymer (EVA), nitrile rubber (NBR), crosslinking agent, reactive polymer and reactive compound under high temperature to obtain polymer blend;
   (b) crosslinking said polymer blend in a mold under high temperature and high pressure.

19. A cable comprising:
the crosslinked composition according to claim 1.

20. The cable according to claim 19, wherein the crosslinked composition is used as a sheath layer of cable for ship or offshore plant.

* * * * *